(12) United States Patent
Abel et al.

(10) Patent No.: US 8,775,367 B2
(45) Date of Patent: *Jul. 8, 2014

(54) ENTERPRISE DATA AS OFFICE CONTENT

(75) Inventors: Todd J. Abel, Redmond, WA (US);
Satish R. Thatte, Redmond, WA (US);
Richard Roma iDalfo, Redmond, WA (US); Mark C. McLoughlin, Redmond, WA (US); Greg Prickril, Bethany, OK (US); Alex Burst, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/524,012

(22) Filed: Jun. 15, 2012

(65) Prior Publication Data

US 2012/0260162 A1 Oct. 11, 2012

Related U.S. Application Data

(63) Continuation of application No. 11/714,636, filed on Mar. 5, 2007, now Pat. No. 8,224,769.

(51) Int. Cl.
*G06F 17/00* (2006.01)
(52) U.S. Cl.
USPC .......................................... 707/608
(58) Field of Classification Search
USPC .......................................... 707/608
See application file for complete search history.

(56) References Cited

U.S. PATENT DOCUMENTS

| | | | |
|---|---|---|---|
| 6,064,406 A | 5/2000 | Atkinson et al. | |
| 6,442,651 B2 | 8/2002 | Crow et al. | |
| 6,782,509 B1 | 8/2004 | Hirayama et al. | |
| 6,785,685 B2 | 8/2004 | Soetarman et al. | |
| 6,925,631 B2 | 8/2005 | Golden | |
| 7,113,940 B1 * | 9/2006 | Jensen | 707/999.004 |
| 7,155,449 B2 | 12/2006 | Pingel et al. | |
| 7,617,447 B1 | 11/2009 | Jones et al. | |
| 2001/0003818 A1 | 6/2001 | Pingel et al. | |
| 2002/0184188 A1 | 12/2002 | Mandyam et al. | |
| 2004/0117731 A1 | 6/2004 | Blyashov | |
| 2004/0205668 A1 | 10/2004 | Eastlake | |
| 2005/0004885 A1 | 1/2005 | Pandian et al. | |
| 2005/0066287 A1 * | 3/2005 | Tattrie et al. | 715/769 |

(Continued)

FOREIGN PATENT DOCUMENTS

WO 0140971 A2 6/2001

OTHER PUBLICATIONS

"Using Visio Diagrams With Other Microsoft Office Programs", Microsoft Office Visio, 2003, http://office.microsoft.com/en-us/assistance/HA011822511033.aspx.

(Continued)

*Primary Examiner* — Rehana Perveen
*Assistant Examiner* — Tiffany Thuy Bui
(74) *Attorney, Agent, or Firm* — Brian Haslam; Thomas Wong; Micky Minhas

(57) ABSTRACT

Techniques for enterprise data as office content are described. An apparatus may comprise a client device having an application program, an insertion component and an update component. The insertion component may be arranged to insert source data elements from a data source into a document for the application program. The update component may be arranged to update the inserted data elements as the source data elements are modified. Other embodiments are described and claimed.

12 Claims, 13 Drawing Sheets

(56) References Cited

U.S. PATENT DOCUMENTS

| | | | |
|---|---|---|---|
| 2005/0119961 A1* | 6/2005 | Tanzillo et al. | 705/36 |
| 2005/0228803 A1 | 10/2005 | Farmer et al. | |
| 2005/0262047 A1 | 11/2005 | Wu et al. | |
| 2006/0090130 A1* | 4/2006 | Bent et al. | 715/530 |
| 2006/0206822 A1 | 9/2006 | DeWitt | |
| 2006/0212299 A1 | 9/2006 | Law | |
| 2007/0162867 A1* | 7/2007 | Dobronsky | 715/779 |
| 2007/0299679 A1 | 12/2007 | Sudan et al. | |
| 2008/0148139 A1* | 6/2008 | Shenfield et al. | 715/205 |
| 2010/0262628 A1 | 10/2010 | Singer | |

OTHER PUBLICATIONS

Weber, et al., "Live Documents With Contextual, Data-Driven Information Components", 2002, pp. 236-247, ACM Press, New York, USA, http://delivery.acm.org/10.1145/5900001584990/p236-weber.pdf?key1=584990&key2=8857801611&coll=GUIDE&dl=GUIDE&CFID=3570950&CFTOKEN=32059275.

* cited by examiner

Insert Business Content

200

Select Desired Business
Content Format

- Line Items as Table
- Quote Summary as Text
- All Data as Text
- All Data as List
- All Data (for ad hoc insertion)

[Previous] [Next] [Cancel]

| Business Data |
|---|
| Customer Quote<br><br>Product Inventory<br><br>- Customer Quote<br>    - Customer<br>        - ID 1234<br>        - Name Woodgrove Bank<br>    - Line Items<br>        - Line Item 1<br>            - Product X555<br>            - Qty 12<br>            - Price 2100<br>        - Line Item 2<br>            - Product X613<br>            - Qty 20<br>            - Price 3600 |

Confirm Delete Embedded Business Data

Remove selected Business Data from this document?

Customer Quote ☐ Delete associated document content

Product Inventory ☑ Delete associated document content

[ Yes ]  [ Cancel ]

```
┌─────────────────────────────────────────────────────┐
│  INSERT SOURCE DATA ELEMENTS FROM A DATA SOURCE     │
│                 INTO A DOCUMENT                     │
│                      1202                           │
└─────────────────────────────────────────────────────┘
                           │
┌─────────────────────────────────────────────────────┐
│  UPDATE THE INSERTED DATA ELEMENTS WHEN THE         │
│     SOURCE DATA ELEMENTS ARE MODIFIED               │
│                      1204                           │
└─────────────────────────────────────────────────────┘
```

FIG. 12

ENTERPRISE DATA AS OFFICE CONTENT

CROSS-REFERENCE OF RELATED APPLICATIONS

This application claims the benefit of, and priority to, previously filed U.S. patent application Ser. No. 11/714,636 entitled "Enterprise Data As Office Content" filed on Mar. 5, 2007, the subject matter of which is hereby incorporated by reference in its entirety.

BACKGROUND

Information workers frequently create, consume and update business objects or entity data stored in line of business (LOB) systems. In some cases, this may be accomplished over a network using various web services. This may allow clients to access the entity data from different locations and from different client machines. In some cases, however, it may be difficult to discover all of the web services available in an enterprise or even what sources of data are available for creating enterprise solutions. In addition, the data may not be in a format that is easily transferred between enterprise solutions or applications. Further, when data is shared between multiple devices or applications, it may be difficult to keep the data synchronized between the devices or applications, as well as between a client and the data source. Consequently, there may be a need for improved techniques to solve these and other problems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments are generally directed to techniques for managing data and operations for a LOB system. Some embodiments in particular may be directed to techniques for embedding LOB data from a LOB application system into an application program residing on a LOB client device. In one embodiment, for example, an apparatus may comprise a client device having an application program, an insertion component and an update component. The insertion component may be arranged to insert source data elements from a data source into a document for the application program. The update component may be arranged to update the inserted data elements as the source data elements are modified.

In one embodiment, for example, the insertion component may insert the source data elements into the document with sufficient information to maintain a reference to the data source, such as an envelope describing an insertion context, the data source, and a view instantiation parameter. In some cases, the envelope information may be implemented using a markup language, such as an Extensible Markup Language (XML) part, for example. Other embodiments are described and claimed.

BRIEF DESCRIPTION OF THE DRAWINGS

FIG. 2 illustrates one embodiment of a first screen shot.
FIG. 3 illustrates one embodiment of content controls for a text formatter.
FIG. 5 illustrates one embodiment of a second screen shot.
FIG. 10 illustrates one embodiment of a sixth screen shot.
FIG. 12 illustrates one embodiment of a logic flow.

DETAILED DESCRIPTION

Figure 1:
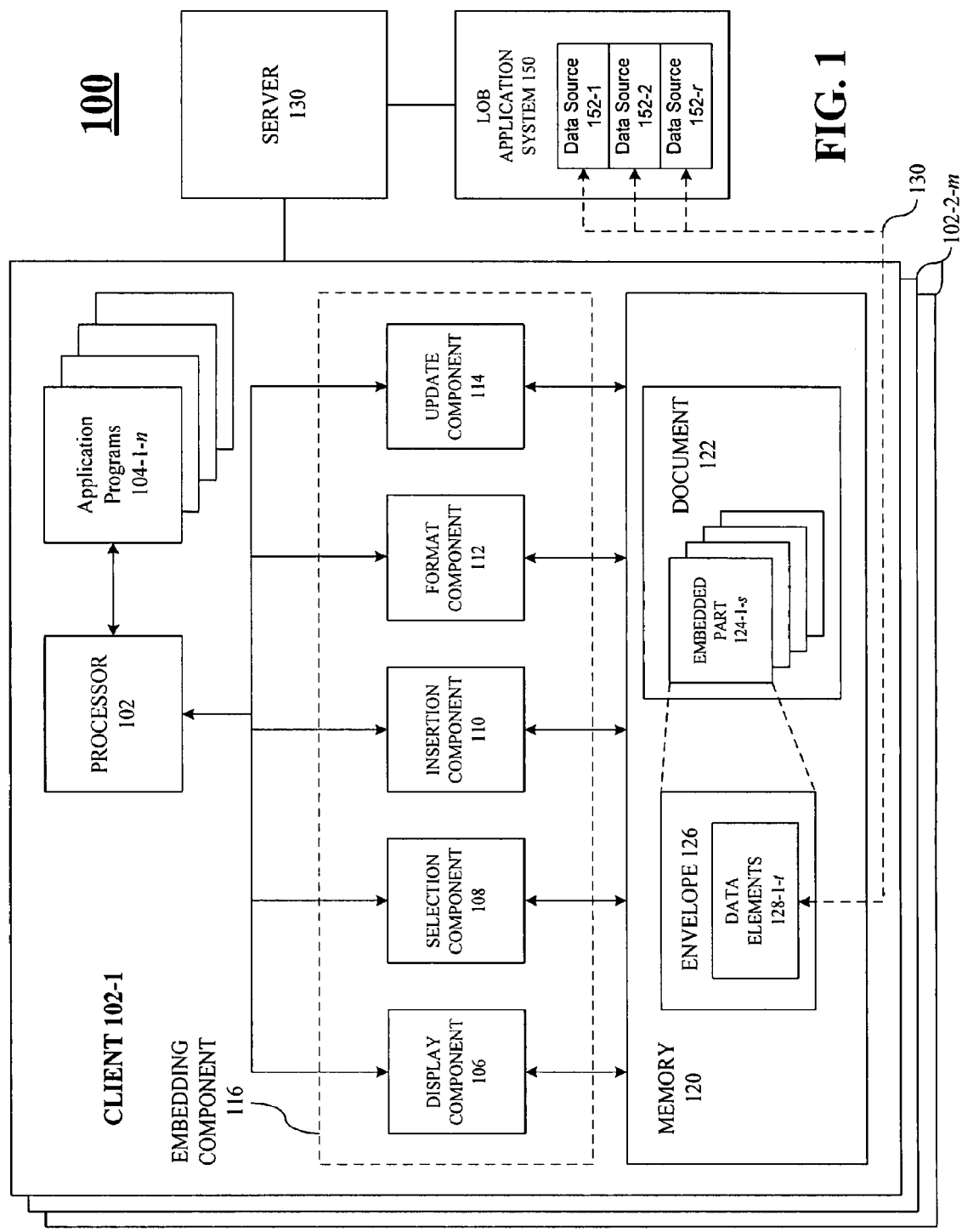
FIG. 1 illustrates one embodiment of an enterprise system.

Various embodiments are directed to techniques for embedding LOB data from a LOB application system into an application program residing on a LOB client device. The LOB data may be displayed, selected and inserted into a document for the application program. The LOB data may be inserted into the document using a defined format, such as for the application program or the LOB application system. The LOB data may be refreshed whenever changes occur to the LOB data maintained by the LOB application system. In this manner, embedded LOB data in a document on a client may be kept current with LOB data maintained by the LOB application system.

Conventional techniques provide limited options when embedding data within a document. For example, there are four primary ways to insert data into a document. A first way is for a user to view a screen or hardcopy output from the source system and type it manually into a document. This manual process is tedious and provides no link with the source data. A second way is for a user to cut data from a screen output from the source system and paste it into a document. The cut-and-paste technique is typically a superficial representation of the data that does not retain a link to the source data. A third way is to perform Object Linking and Embedding (OLE). OLE is a distributed object system and protocol developed by MICROSOFT® Corporation, Redmond, Wash. OLE embedding allows other applications to render data in the document canvas in a way that is opaque to the application program receiving the data. Despite the advantages of OLE embedding, this technique typically does not allow native formatting of the data in the receiving application program. A fourth way is a database query. A database query represents higher end functionality to allow simple database query formulation and insertion of the results into native documents. Database queries, however, are relatively complex and typically do not allow various formatting and linking options.

Various embodiments attempt to solve these and other problems. Various embodiments enable users to take enterprise data and insert it with native formatting in host application programs, such as a productivity application program from MICROSOFT Corporation. The link from the embedded content to the source enterprise data is maintained allowing data to be refreshed on demand or automatically. Embedded enterprise information may be exposed for use in organizing and indexing documents.

LOBi entity models will expose a business entity abstraction over LOB application systems. Typically, end-user interaction with this abstraction layer will be through rendered views hosted in various applications, both thin client and rich client. This feature will allow users to take the information presented to them in these views and insert it into documents for the host application programs in a way that allows them to have full formatting control and the ability to refresh the data when they want. Refresh operations can be performed on demand, on document open, on a schedule, and so forth. The user can also intentionally disconnect the document from its source in which case the embedded data is no longer refreshable Various embodiments provide several advantages for embedding operations. For example, the relationship between enterprise data in a document and the source of that data is maintained and can be used to refresh the document content as required. In another example, users do not need to design queries. Rather, users can choose from predefined views. In yet another example, enterprise data in documents can be fully formatted using the native capabilities of the application program receiving the enterprise data.

Once enterprise data is inserted into a document it can provide other advantages in addition to formatting and refresh features. For example, the embedded enterprise data may be used to position the document in a taxonomy without further user input, a technique referred to as auto-classification. It can also be used as key data in a property-based (in addition to a full-text) index to support property-based searches. These and other advantages may be further described with various embodiments below.

FIG. 1 illustrates one embodiment of an enterprise system 100. The enterprise system 100 may be suitable for implementing a system for a business or enterprise, such as a LOB system. As shown in FIG. 1, the enterprise system 100 includes one or more clients 102-1-$m$, a server 130 and a LOB application system 150. It may be appreciated that the enterprise system 100 may comprise more or less elements as desired for a given implementation. It may also be appreciated that FIG. 1 also illustrates a subset of elements typically implemented for a computing device or system, and a more detailed computing system architecture suitable for implementing the clients 102-1-$m$, the server 130, and/or the LOB application system 150 may be described with reference to FIG. 13. The embodiments are not limited in this context.

As used herein the terms "component" and "system" are intended to refer to a computer-related entity, either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In various embodiments, the enterprise system 100 may include the LOB application system 150. A LOB system generally includes various LOB application programs typically implemented on enterprise hardware platforms for a business entity. LOB application programs are application programs designed to provide various business application services. Examples of LOB application programs may include a Customer Relationship Management (CRM) application program, an Enterprise Resource Planning (ERP) application program, a Supply Chain Management (SCM) application program, and other business application programs using business-oriented application logic. In one embodiment, for example, the LOB application programs may each maintain separate or collective data stores for application data represented in FIG. 1 as data sources 152-1-$r$. In one embodiment, for example, the data sources 152-1-$r$ may each be implemented in the form of various web services, sometimes referred to as Entity Web Services (EWS).

In various embodiments, the LOB application system 150 may comprise an enterprise hardware platform for a business entity suitable for storing and executing the EWS to create, read, update, delete, query or otherwise process LOB data or enterprise data stored in an LOB system database. In addition to storing the LOB data in the LOB application system 150, the LOB data for the various LOB application programs may be stored in various elements throughout a LOB system, including a middle-tier LOB server 130 and multiple LOB client devices 102-1-$m$, for example. The LOB application system 150 may be implemented on any hardware and/or software platform as described for the clients 102-1-$m$ and the server 130, as well as others. The embodiments are not limited in this context.

In various embodiments, the enterprise system 100 may include one or more servers 130. The server 130 may be communicatively coupled to the LOB system 140. The server 130 may any comprise any server device or server system arranged to use or process LOB data for one or more of the data sources 152-1-$r$ of the LOB application system 150. Examples for the server 130 may include but are not limited to a processing system, computer, server, work station, personal computer, desktop computer, and so forth. The embodiments are not limited in this context. In one embodiment, for example, the server 130 may be implemented as a middle-tier LOB server.

In various embodiments, the enterprise system 100 may include one or more clients 102-1-$m$. The clients 102-1-$m$ may comprise any client device or client system arranged to use or process LOB data or enterprise data for one or more of the data sources 152-1-$r$ of the LOB application system 150. Examples for client 102-1-$m$ may include but are not limited to a processing system, computer, server, work station, appliance, terminal, personal computer, laptop, ultra-laptop, handheld computer, personal digital assistant, consumer electronics, television, digital television, set top box, telephone, mobile telephone, cellular telephone, handset, wireless access point, base station, subscriber station, mobile subscriber center, radio network controller, router, hub, gateway, bridge, switch, machine, or combination thereof. In one embodiment, for example, a client 102-1-$m$ may be implemented as an LOB client device, application or system.

A more detailed block diagram for the clients 102-1-$m$ may be provided with the client 102-1. It may be appreciated that the various elements provided with the client 102-1 may apply to any of the other clients 102-2-$m$ as desired for a given implementation. As shown in FIG. 1, the client 102-1 may include a processor 102 communicatively coupled to one or more application programs 104-1-$n$. The processor 102 may also be communicatively coupled to an embedding component 116. The embedding component may comprise a display component 106, a selection component 108, a format component 112, an insertion component 110, and an update component 114. The embedding component may be communicatively coupled to a memory 120.

In various embodiments, the client 102-1 may include one or more host application programs 104-1-$n$ communicatively coupled to the processor 102. A host application program may comprise any application program that is responsible for authoring documents. Examples of the host application programs 104-1-$n$ may include but are not limited to productivity application programs that are part of a MICROSOFT OFFICE suite of application programs, such as a MICROSOFT WORD application program, a MICROSOFT EXCEL application program, a MICROSOFT POWERPOINT application program, a MICROSOFT ACCESS application program, a MICROSOFT VISIO application program, a MICROSOFT OUTLOOK application program, and so forth. For example, an application program 104-1 may comprise the MICROSOFT OUTLOOK application program. The MICROSOFT OUTLOOK application program 104-1 is a personal information manager. Although often used mainly as an electronic mail (email) application, it also provides other application services such as calendar, task and contact management, note taking, and a journal. Application programs 104-1-$n$ can be used as stand-alone applications, but can also operate in conjunction with a MICROSOFT EXCHANGE server to provide enhanced functions for multiple users in an organization, such as shared mailboxes and calendars, public folders and meeting time allocation. Client data for the MICROSOFT OUTLOOK application program may be stored in an OUTLOOK client database or data store (not shown).

Various embodiments may be described with reference to MICROSOFT OFFICE application program by way of example. In the context of a host application program from the MICROSOFT OFFICE suite of application programs, the application program may also be referred to herein as an Office Business Application (OBA). An OBA may comprise a generic term for applications built on a LOBi application framework. Although some embodiments may be described with reference to MICROSOFT OFFICE application programs by way of example, it may be appreciated that the embedding techniques described herein apply to any host application programs as desired for a given implementation. The embodiments are not limited in this context.

In various embodiments, the client 102-1 may include a memory unit 120. The memory unit 120 may represent typical system memory (e.g., random access memory) or a persistent data store such as a hard drive or optical drive. In one embodiment, for example, the memory 120 may comprise part of a client data store (CDS). A CDS may comprise a data store for client side cached data. In one embodiment, for example, the CDS may store client side cached LOB data that mirrors the LOB data stored by the middle-tier LOB server 130 and/or the LOB application system 150. Further, the CDS may store various tables for a given data schema. The CDS may maintain this information as part of a Structured Query Language (SQL) database. SQL is a computer language used to create, modify, retrieve and manipulate data from relational database management systems. In one embodiment, for example, the CDS may be implemented as an SQL Express database.

In various embodiments, the client 102-1 may include the embedding component 116. The embedding component 116 may be arranged to perform and manage embedding operations to embed enterprise data from the data sources 152-1-$r$ into a document for the host application programs 104-1-$n$. If users can see data in an Office Business Part (OBP) there should be a way for them to get that data into their document. An OBP may comprise an OBA solution component for rendering business data in a task oriented interface. To accomplish this, the embedding component 116 should capture enough information at insertion time to allow a user to refresh the data at a later time.

More particularly, the embedding component 116 may be arranged to insert information from the data sources 152-1-$r$ into a document 122 in the form of embedded parts 124-1-$p$. Document 122 may be representative of a document authored by a host application program 104-1-$n$. Each embedded part 124-1-$p$ may comprise an envelope 126. The envelope 126 may further comprise one or more source data elements 128-1-$t$ from one or more data sources 152-1-$r$. The envelope 126 may comprise envelope information representing metadata or control information for the source data elements 128-1-$t$, such as information needed to maintain a link 130 between the data elements 128-1-$s$ and corresponding data sources 152-1-$r$, formatting information for the data elements 128-1-$s$, an insertion context, a view instantiation parameter, and other useful information.

In one embodiment, for example, the embedding component 116 may include the display component 106. The display component 106 may be arranged to display a view instance of the source data elements 128-1-$s$. For example, this may be accomplished by activating an OBP which displays the desired data. In one embodiment, for example, the source data elements 128-1-$s$ may be displayed using an Office Business View (OBV) associated with an OBP. An OBV may comprise an OBA solution component for retrieving data from the EWS of the LOB application system 150. An OBV may provide some standard display formats, such as text, list, table, and "ad hoc." In addition, an OBV may provide customized display formats as well.

In one embodiment, for example, the embedding component 116 may include the selection component 108. The selection component 108 may be arranged to select the source data elements 128-1-$s$ from a view instance. A user may view the displayed source data elements 128-1-$s$ from the various data sources 152-1-$r$. The user may select the desired source data elements 128-1-$s$ for embedding into the document. Activation can occur contextually via a technique such as "Smart Tags," or through search operations.

In one embodiment, for example, the embedding component 116 may include the insertion component 110. The insertion component 110 may be arranged to insert source data elements 128-1-$s$ from a data source 152-1-$r$ into the document 122 for the application program 104-1-$n$. Once the OBP showing the desired data is activated, the user must choose to embed it in the current document. Each OBP should support an "Insert into Document" action. This action could be exposed through local menus on the OBP or through application/document level "Insert" menu sub-actions. On selecting this action, a dialog (wizard) may be activated for the user to choose which source data elements 128-1-$s$ to embed and how it should be displayed. The supported combinations of data and format are defined by a Business Content Formatter (BCF) registered for the OBP and for a document host. A BCF may comprise an OBA solution component responsible for rendering business data in an MICROSOFT OFFICE document.

In one embodiment, for example, the embedding component 116 may include the format component 112. The format component 112 may be arranged to select a format for the inserted data elements from a list of defined formats. For example, assume an OBP provides an underlying XML representation of the view data. In this case, the format component 112 may provide various defined formats or generic renderings at insertion time. Some examples of defined formats may include text formats, list formats, table formats, and so forth. In some cases, the defined formats may include custom renderings suitable for a given application program 104-1-$n$, such as a MICROSOFT WORD Form Layout, a MICROSOFT EXCEL PivotTable Format, a MICROSOFT VISIO Graphical Format, and so forth.

FIG. 2 illustrates one embodiment of a graphic user interface (GUI) screen shot 200. The GUI screen shot 200 represent a GUI of a wizard dialog for selecting a BCF for the source data elements 128-1-s. As shown in FIG. 2, the BCF for the source data elements 128-1-s may include any number of defined formats, including a "Line Items as Table" format, a "Quote Summary as Text" format, an "All Data as Text" format, an "All Data as List" format, and an "All Data (for ad hoc insertion)" format. Other defined formats may be utilized as well.

In one embodiment, for example, the insertion component 110 may insert the source data elements 128-1-s from a data source 152-1-r into the document 122 using the envelope 126. The envelope 126 may comprise information related to the data elements 128-1-s, the host application programs 104-1-n, and/or the data sources 152-1-r. In one embodiment, for example, the envelope 126 may describe an insertion context, said data source, and a view instantiation parameter. For example, once the BCF is selected, the insertion component 110 adds a new custom XML part to the document 122. This custom XML part may comprise the OBV instance data as specified by the selected BCF encased in the envelope 126 describing the insertion context, the source OBV and the view instantiation parameters.

An example of pseudocode for the insertion component 110 may be illustrated as follows:

```
<OBASContent>
<OBASContentProperties>
    <Name>Customer Quote</Name>
    <Description>Details of a particular Quote</Description>
    <LastRefresh>10:52:00 O5-18-2006</LastRefresh>
    <OBASInsertionContext>
      "obas:\\Customers\CustomerQuoteView?id=Q922"
      </OBASInsertionContext>
      <OBASInsertionData>
        "obas:\\(CustomerQuoteView?id=@Q922).GetLineItemsView"
      </OBASInsertionData >
</OBASContentProperties>
    <OBASData>
      <CustomerQuoteLineItems>
        <LineItem ID="1">
            <Product>X555</Product>
            <Qty>12</Qty>
            <Price>2100</Price>
         </LineItem>
        <LineItem ID="2">
            <Product>X613</Product>
            <Qty>20</Qty>
            <Price>3600</Price>
         </LineItem>
      </CustomerQuoteLineItems >
    </OBASData>
</OBASContent>
```

The exact syntax of the OBASInsertionData and OBASInsertionContext nodes may vary for a given implementation. The OBASInsertionData node should contain enough information for the runtime to return the specified view data. The OBASInsertionContext node should contain enough information to reactivate the original OBP from which the insertion was performed.

In some cases, the custom XML part may include the actual view data. On document open, however, this solution may have the disadvantage of potentially displaying the source data items 128-1-s that may be out-of-date. Alternatively, the custom XML part may not embed the actual view data in the custom XML part. On document open, the view data will be retrieved and bound to the content controls directly. This approach ensures that the user viewing the document sees only data authenticated by the LOB application system 150.

After embedding the source data items 128-1-s into the document 122, the source data items 128-1-s must be formatted for display. The initial rendering is defined by the chosen BCF after which the user can insert data in an ad hoc manner by dragging data from the business data task pane onto the document surface. There are three standard content formatters, including a text formatter, a list formatter, and an ad hoc formatter. An example of a text formatter may be described with reference to FIG. 3, and an example of a list formatter may be described with reference to FIG. 4. The ad hoc formatter creates no word content at all. The user must subsequently select the source data items 128-1-s to insert into the document.

Figure 3:
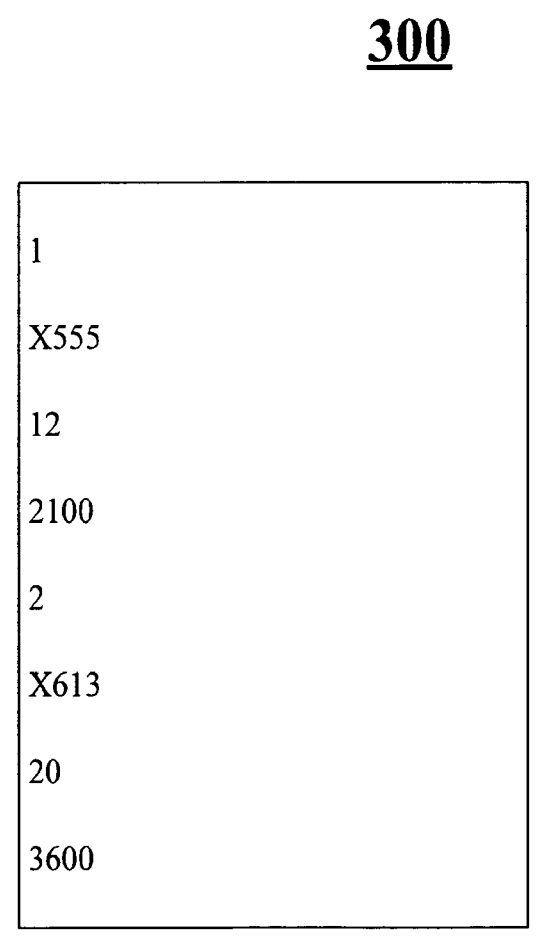

FIG. 3 illustrates one embodiment of content controls for a text formatter 300 for a word processing document. The text formatter 300 creates a word content control for each leaf node in the embedded XML part and binds it to that node. Each content control appears on a new line in the document.

Figure 4:
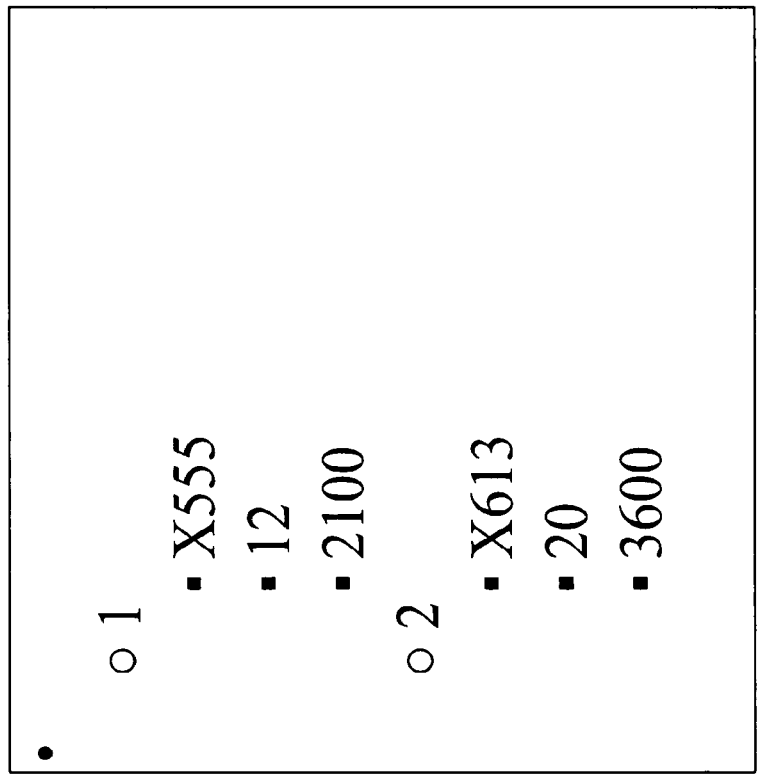
FIG. 4 illustrates one embodiment of content controls for a list formatter.

FIG. 4 illustrates one embodiment of content controls for a list formatter 400 for a word processing document. The list formatter 400 creates a word content control for each leaf node in the embedded XML part and binds it to that node. Each XML node from the embedded data generates a word list item at the appropriate hierarchy depth.

In addition to the text formatter, line formatter and ad hoc formatter, custom formatters may be developed by solution developers for a given OBP. Custom formatters are annotated to indicate the OBP/Host combinations for which they can be used. The custom formatter should provide the appropriate OBASInsertionData reference to be used when creating the custom XML part. The custom formatter should also implement the generation of the document content. A reference to the target document object and the ID of the new custom XML part will be passed to the content generation function.

FIG. 5 illustrates a GUI screen shot 500. The GUI screen shot 500 shows a business data task pane that shows a view instance of the various embedded parts 124-1-p and corresponding source data elements 128-1-t currently embedded in the document 122. Each piece of inserted data appears as an item in a list view control (or similar) at the top of the task pane. When an item is selected in this view, a tree view control (or similar) below it shows the actual embedded XML data. Each node label is comprised of the XML node tag concatenated with the XML node value.

Figure 6:
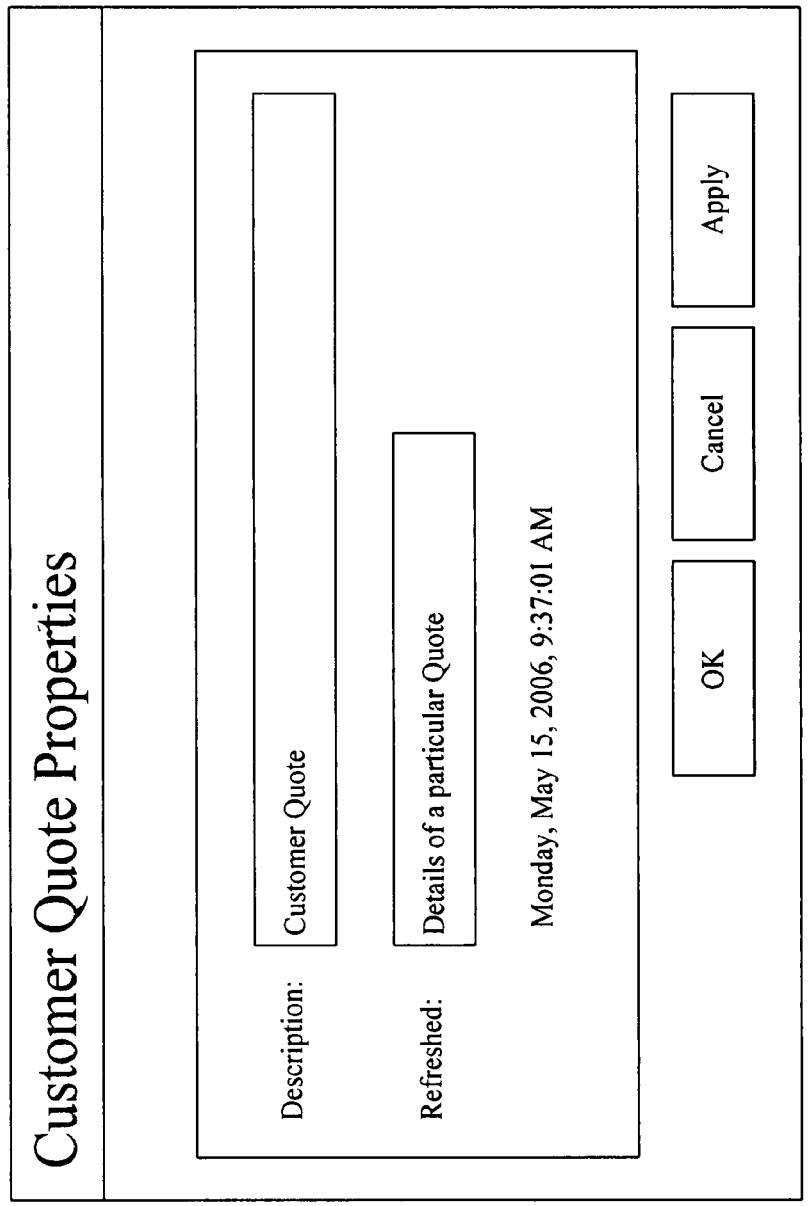
FIG. 6 illustrates one embodiment of a third screen shot.

FIG. 6 illustrates a GUI screen shot 600. The GUI screen shot 500 shows a property page view. Each item of inserted data has an associated set of properties viewable on a property page. Each data item will support a context menu showing two actions. The first action is labeled "Properties" which shows the property page. The second action is labeled "View Original Context" which activates the context described in the OBASInsertionContext node for this item. If this node is absent, the context menu will not list this action. After data is inserted, the business data task pane is activated with the just-inserted data item selected in the upper list view. In one embodiment, for example, a BCF may be arranged to dynamically generate a data explorer tree view on demand. This may be useful when attempting to support non-cached enterprise data.

Figure 7:
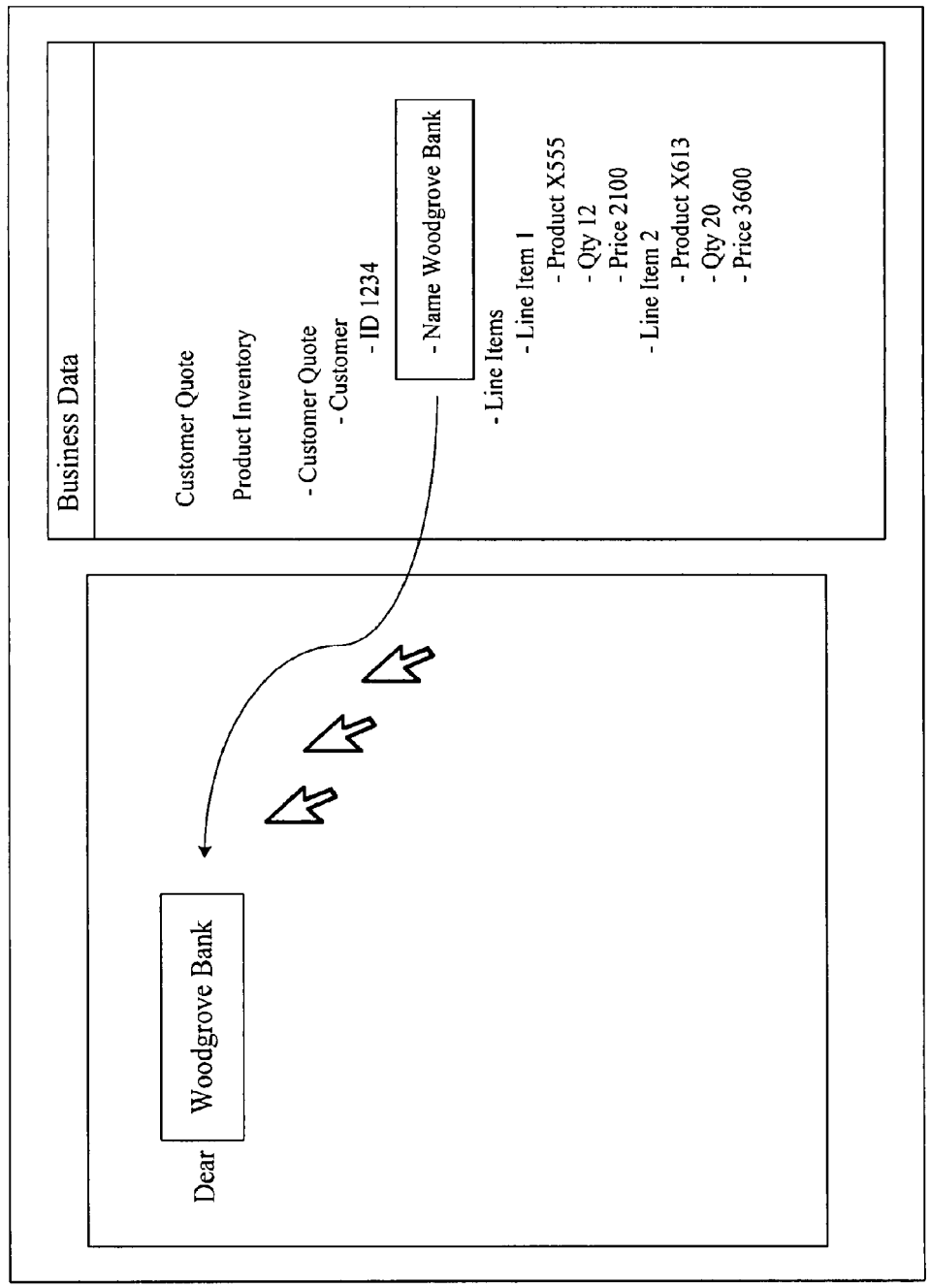
FIG. 7 illustrates one embodiment of a fourth screen shot.

FIG. 7 illustrates a GUI screen shot 700. The GUI screen shot 700 shows a business data task pane (500) as described with reference to FIG. 5, with a blank document for an application program 104-1-n such as a word processing document. As shown in FIG. 7, from the business data task pane the use can select a leaf or node of the tree and drag it onto the document. At this point a word content control is inserted into the document and bound to the appropriate XML node in the custom XML part associated with the specified business data. In one embodiment, for example, a BCF may be arranged to handle the ad hoc insertion request. In this manner the facility may be generalized so solution developers can decide what document artifact to create when a data item is inserted ad-hoc into a document.

Figure 8:
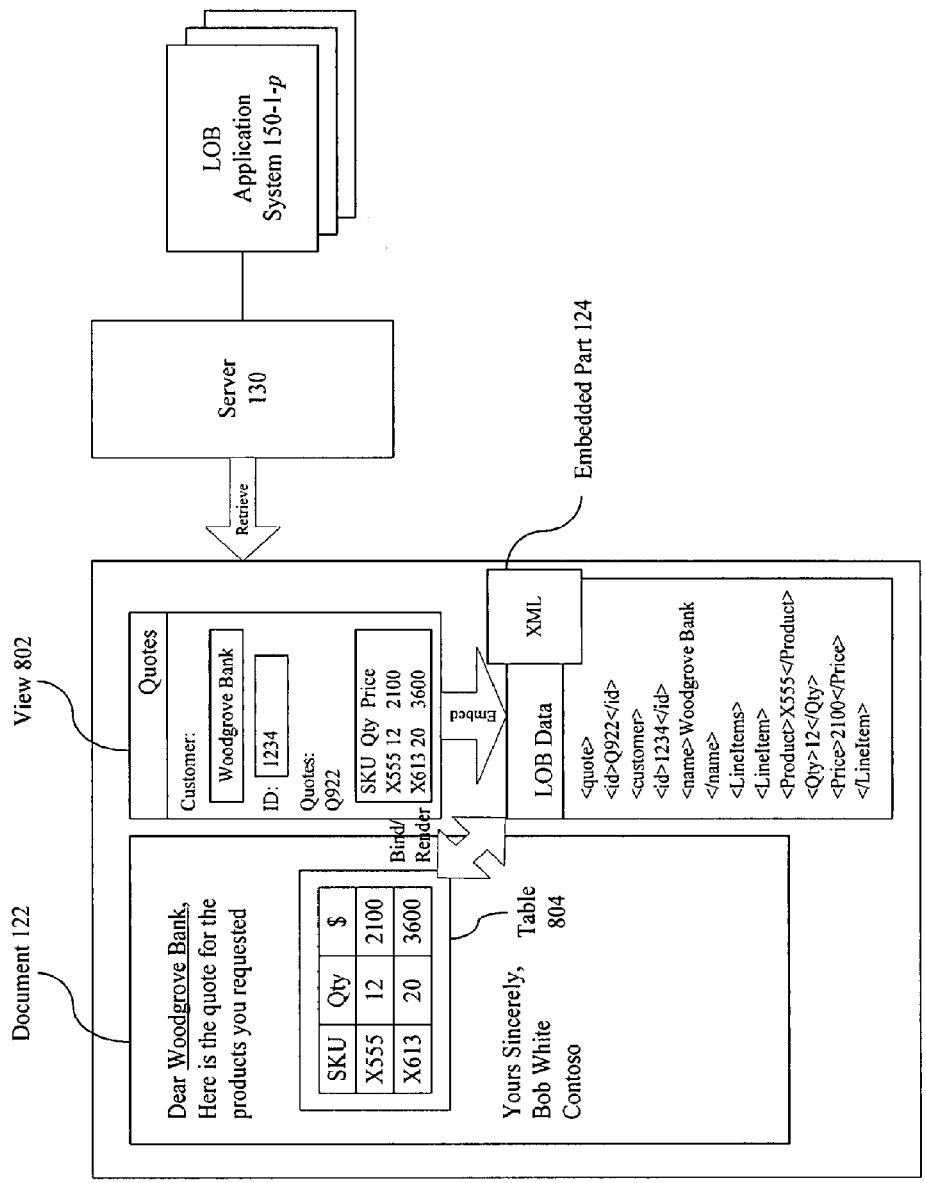
FIG. 8 illustrates one embodiment of a data flow for embedding operations.
Figure 9:
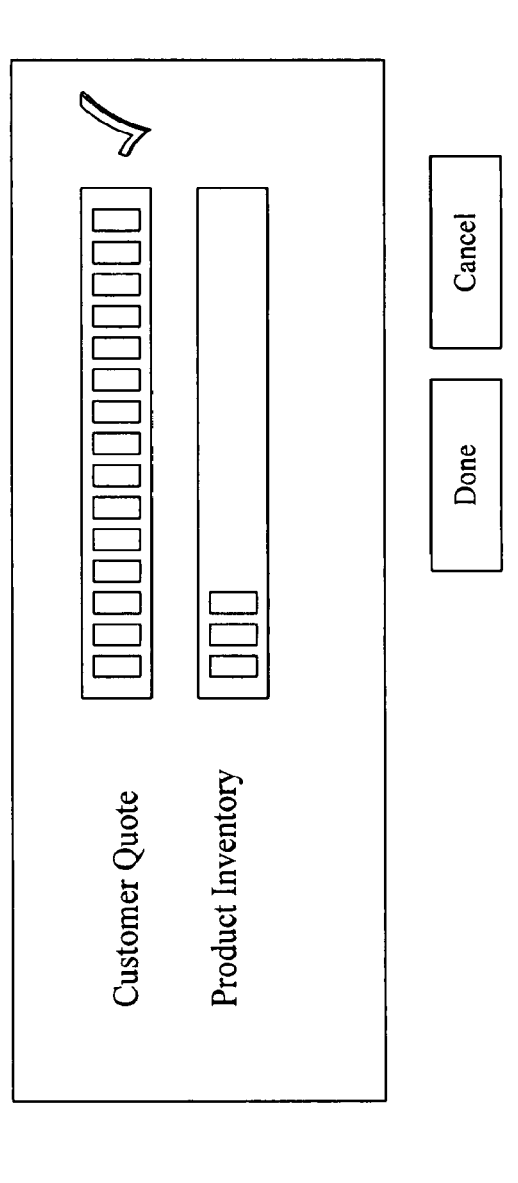
FIG. 9 illustrates one embodiment of a fifth screen shot.

FIG. 8 illustrates one embodiment of a data flow 800 for embedding operations. The data flow 800 provides an overview of the various features of the embedding process. Assume an application program 104-1-n is activated to perform word processing operations. The application program 104-1-n may display a blank document 122. A user may begin typing a letter to a customer to provide a product quote. The user may begin typing the words "Dear Woodgrove Bank." The term "Woodgrove Bank" may comprise an entity defined for a customer as indicated by the document 122 with underlined text features. The customer entity may have an entity model with customer data as maintained by a CRM application program of the LOB application system 150. As a user types the term "Woodgrove Bank" into the document 122, the application program 104-1-n may retrieve customer data for the customer entity "Woodgrove Bank" from the CRM application program via the middle-tier LOB server 130. The application program 104-1-n may display the retrieved customer data in a view 802 using the display component 106. The view 802 may include a customer name, a customer identifier, and a customer quote.

Assume a user desires to embed the quote information for quote number "Q922" into the document 122. The user may select the source data elements 128-1-s from the view 802 via the selection component 1008. The user may also select a defined format for the selected source data elements 128-1-s, such as a table format. The insertion component 110 may create and insert a new embedded XML part 124 into the document 122. The application program 104-1-n may display the source data elements 128-1-s from the embedded XML part 124 as a table 804 having the source data elements 128-1-s.

In some cases, a user may want to edit the embedded data. The user may update embedded data through the content controls but these changes are sometimes persisted to only the cached data. When users modify the embedded business data rendered in the document, their changes are made to the values in the custom XML part. The BCF developers are responsible for the rendering of the data in the document and so can if they wish set the "read-only" property of any or all generated content controls to "TRUE." This supports a scenario where for example the contact name returned from the LOB application system 150 is "Mr. Andrew Smith Jr III" but the user wants it to appear as "Mr. Smith" throughout the document 122. When the embedded data is refreshed, however, the user changes to the embedded data may be lost. This result may be avoided by preserving user changes using a "modified" indicator on the cached data, and prompting whether or not to overwrite user edits on a refresh operation.

Referring again to FIG. 1, the embedding component 116 may include the update component 114. The update component 114 may be arranged to update the inserted data elements as the source data elements 128-1-s are modified by the data sources 152-1-r. In some cases, the source data elements 128-1-s may be changed after insertion into the document 122. For example, a LOB application program may change the data source elements 128-1-s as stored with the corresponding data source 152-1-r. In another example, another client device 102-1-m may change the data source elements 128-1-s that are later synchronized with the corresponding data source 152-1-r. The update component 114 may use the envelope information provided by the envelope 126 of the embedded parts 124-1-p to maintain a link 130 with the corresponding data source 152-1-r maintaining the source data elements 128-1-s. As changes occur to the source data elements 128-1-s as maintained by the corresponding data source 152-1-r, the changes may be propagated to the client 102-1-m with the document 122 to update the embedded source data elements 128-1-s via the link 130. The changes may be made in any number of ways, such as synchronously, asynchronously, on demand, periodically, aperiodically, and so forth.

Referring again to our example provided in FIG. 8, assume the CRM application program of the LOB application system 150 updates prices for the products described in the price quote "Q922." In this case, the embedded XML part 124 may be updated with the new prices, which are then displayed by the document 122 via the table 804.

FIG. 900 illustrates a GUI screen shot 900. The GUI screen shot 900 shows a business data task pane for refreshing business data. In various embodiments, embedded data can be refreshed by selecting the business data in the business data task pane and choosing the "Refresh" action. Multi-select may be supported. During a refresh operation, a status dialog may be displayed indicating progress/success/failure of the action for each selected item. Undo of the Refresh action may be supported as well.

The refresh action can result in various returned status messages. For example, the refresh action may return a "Refresh Successful" status message. In another example, the refresh action may return a "Refresh failed: LOB service unavailable" status message. This type of status message may occur if the data is not in the CDS and the user is offline. In another example, the refresh action may return a "Refresh failed: LOB permission denied" status message. This type of status message may occur if the data is not in the CDS, the user is online and the EWS returns a permission denied error. In another example, the refresh action may return a "Refresh failed: LOB service not defined" status message. This type of status message may occur if the EWS is not registered on the client.

If the data supports repeating sections and the cardinality of the section changes on refresh, no additional content will be automatically inserted and no unneeded content controls will be deleted. In other words, the refresh action affects only the custom XML part. The user can employ ad-hoc insertion to add new data returned by the refresh action. If the user wishes to "reset" the embedded data back to its original state they could use "Undo" or they could delete and re-insert the data.

As previously described, the refresh or update operations may be initiated by the client 102-1-m, the server 130, or the LOB application system 150. On the server side, the custom XML parts can be manipulated using, for example, the WinFX System.IO.Packaging set of APIs. By capturing the OBV reference in the custom XML part we allow server-side code to selectively refresh embedded business data.

FIG. 10 illustrates a GUI screen shot 1000. The GUI screen shot 100 shows a business data task pane for a delete operation. In some cases, a user may desire to delete the embedded data from the document 122. The embedded data can be deleted by selecting it in the business data task pane and choosing the "Delete" action. Multi-select may be supported. The delete action will prompt whether or not to delete content from the document as well. If the option to delete associated document content is checked, the delete process will scan the document looking for content controls bound to the specified business data and delete them from the document. In some cases, the BCF may be allowed to handle requests to delete associated document content. In the general case only the BCF will typically know what document artifacts were associated with the deleted data.

In various embodiments, the various embedding operations should support multiple levels of "Undo" actions. For example, the embedding operations supporting undo actions should include the "Insert into Document" action, the "Refresh Business Data" action, the "Delete Business Data" action, and the "Ad Hoc Insertion of business data" action.

Figure 11:
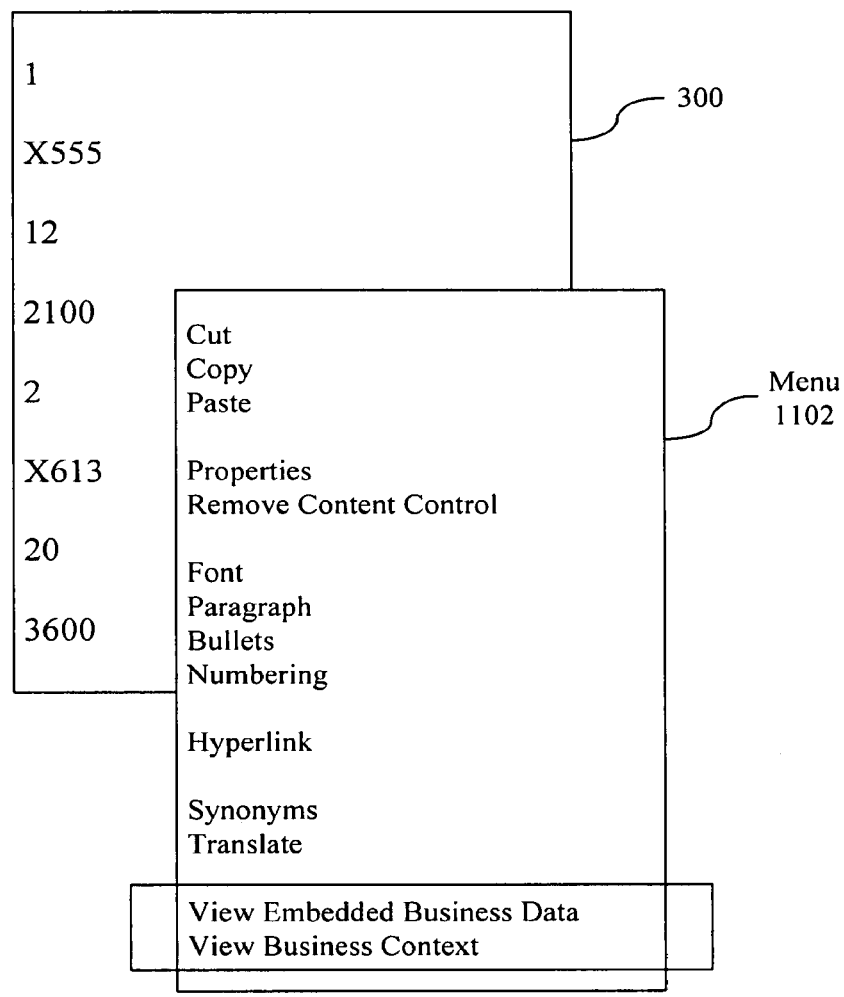
FIG. 11 illustrates one embodiment of an seventh screen shot.

FIG. 11 illustrates a GUI screen shot 1100. The GUI screen shot 1100 shows a context menu 1102 for context activation. When the document insertion point is within a document bound content control, a context menu can provide the option to activate the original insertion context, that is, reactivate the OBP from which the insertion was initiated. The "View Embedded Business Data . . . " action opens the business data task pane with the source business data item selected and the source property highlighted. The "View Business Context . . . " action activates the context described in the OBASInsertionContext node for this item. If this node is absent, the context menu will not list this action. When the OBASInsertionContext is reactivated it will be populated with the data currently in the CDS, as opposed to the data currently embedded in the document.

Operations for the enterprise system 100 may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more elements of the enterprise system 100 or alternative elements as desired for a given set of design and performance constraints.

FIG. 12 illustrates a logic flow 1200. The logic flow 1200 may be representative of the operations executed by one or more embodiments described herein. As shown in FIG. 12, the logic flow 1200 may insert source data elements from a data source into a document. The logic flow 1200 may update the inserted data elements when the source data elements are modified. The embodiments are not limited in this context.

In various embodiments, a view instance of the source data elements may be displayed. The source data elements may be selected from the view instance. A format for the inserted data elements may be selected from a list of defined formats. The defined formats may be provided by an application program, a data source, or a solution developer. The source data elements may be inserted into the document as a custom XML part. The custom XML part may include envelope information describing an insertion context, data source, and context/view instantiation parameters. The embodiments are not limited in this context.

Various embodiments may be suitable for various use scenarios. For example, six use scenarios are described below. It may be appreciated that these six use scenarios are by way of example only, and many other use scenarios may be contemplated for the various embodiments as previously described.

In a first example of a user scenario, assume a user wants to prepare an invoice letter. The user may retrieve current outstanding invoice information for a customer and present as part of a letter to be printed and mailed. Assume John is an account receivable staff member who receives phone call from large customer asking for a single letter listing outstanding invoices. John receives phone call from Ann at Woodgrove Bank asking for a letter detailing current outstanding invoices. John opens a new document in MICROSOFT WORD, and starts typing letter to Ann at Woodgrove Bank. The LOBi application framework detects a reference to Woodgrove Bank, and activates a smart tag. John invokes a smart tag actions menu and chooses to view customer details. An OBP displays "Woodgrove Bank" default customer view in a task pane. John chooses a "view outstanding invoices" action in customer view OBP. A second OBP is loaded into the task pane showing outstanding invoices. John chooses the "Insert into document" action from this OBP. The OBP dialog asks for a data format, such as table, numbered list, and so forth. John chooses the table format and invoice data is inserted into the document at the current insertion point as a MICROSOFT WORD table. John formats the table, possibly using "Autoformat" options. John completes the letter, prints and mails it.

In a second example of a use scenario, assume a user is preparing a quarterly sales report presentation to executives including sales performance figures. Every three months, a Sales Manager named Jane presents to executives. She always needs a slide showing monthly actual versus target sales for the past quarter for major product categories. Jane opens a new document in MICROSOFT POWERPOINT, and selects the "Quarterly Sales Presentation" template. The template opens with predefined outline slides and the embedded content automatically retrieves sales data. Jane next selects the "Sales Data" slide. The embedded content is already populated with data for the last closed quarter. Jane uses the MICROSOFT POWERPOINT formatting actions to highlight certain figures, such as color emphasis, callouts with comments, and so forth. Jane completes some of the other sections of her presentation and saves it. Later, Jane reopens the presentation to continue working. On opening, Jane is asked if she wishes to refresh the embedded content. She also sees on option to not prompt about refreshing her any more on document open. She selects the options to not refresh the content and to not ask her any more. She can still select/highlight the embedded content and request that it be refreshed at a later time. Jane completes the presentation.

In a third example of a use scenario, assume a user generates an ad hoc "what if" contract pricing analysis. The user wants to adjust detail line pricing in a contract to reduce total price below a threshold. Assume a Sales Representative named Bob is preparing a goods and services contract for Woodgrove Bank. The Bank has made it clear that the total price needs to come in under $250,000. Bob opens a document (workbook) in MICROSOFT EXCEL. Bob uses various OBPs to navigate to a detailed view of the Woodgrove Bank contract. Bob chooses the "Insert into Document" action from the contract view and selects "Grids of cells" format. Bob builds his own calculated cells using the contract data, such as for analyzing profit margins. He then adjusts line item pricing to attempt to reduce the total price below the threshold, possibly even using goal seeking. When he is satisfied with the new figures he submits them by saving the spreadsheet, and he is presented with a confirmation dialog showing the new values. Bob elects to submit the new values back to the source system(s).

In a fourth example of a use scenario, assume a user wants to prepare a form letter by selecting associated business entities. Assume our Sales Representative Bob from time-to-time needs to prepare a standard document for his customers describing their current contract terms and reminding them about the need to renew their contract in the next three months. Bob opens a MICROSOFT WORD document and selects the "Contract Renewal Reminder" template. The template contains two embedded content fragments, including a customer details fragment and a contract details fragment. On opening, the embedded fragments each detect that they have not been bound to particular business entity views. Bob is asked to select a customer details view and then a contract details view for that customer. Once the embedded fragments are bound to business entity views, elements of the views are rendered in the document. Bob adds personal comments to the letter, saves it, prints it and delivers it.

In a fifth example of a use scenario, assume a user wants to create a form letter template. Assume an Office Manager named Michael wants to simplify the process of preparing a standard document for his Sales Representatives to send to customers describing their current contract terms and reminding them about the need to renew their contract in the next three months. Michael opens a MICROSOFT WORD document, and creates a new template. He opens the OBA task pane and navigates to a view of a particular customer's contract terms, possibly starting at a search dialog. He chooses the "Insert into Document" action, selects the table format and checks the option to insert data labels only. He formats the labels the way he wants, adds other standard sections and saves the template for later use.

In a sixth example of a use scenario, assume a user wants to create an "Insert into Document" action for an OBP. Assume an OBA Solution Developer named Don wants to enable users of his solution to insert data presented in his OBP into MICROSOFT OFFICE documents. Don opens his OBA solution project. He chooses the "Add Business Content Formatter" action for the solution and a wizard starts. The wizard asks with which OBP the formatter is associated. Don chooses one from those defined in his solution. It asks which hosts the formatter can be used in, such as MICROSOFT WORD 2007, MICROSOFT EXCEL 2007, and so forth. Don chooses MICROSOFT WORD 2007. The wizard generates a class template inheriting from OBAS.BusinessContentFormatter or something similar. Don implements the "GetBusinessDataReference(InitiatingOBP)" method which uses the information in the OBV associated with the initiating OBP to determine the required reference for the OBV to be used by this formatter. For example, the "Customer Quote" OBP is associated with the "Customer Quote View" OBV. Don's formatter can use the "quoteID" from this OBV to generate the reference to the appropriate CustomerQuoteLineItemsView OBV. Don implements the "InsertFormattedContent (DocumentHandle, XMLPartID)" method by traversing the locally stored OBV schema data and operating on the supplied DocumentHandle to create a new custom XML part populated with the base "schema data" and then inserting MICROSOFT WORD artifacts to display the data, in this case content controls bound to the custom XML part.

Figure 13:
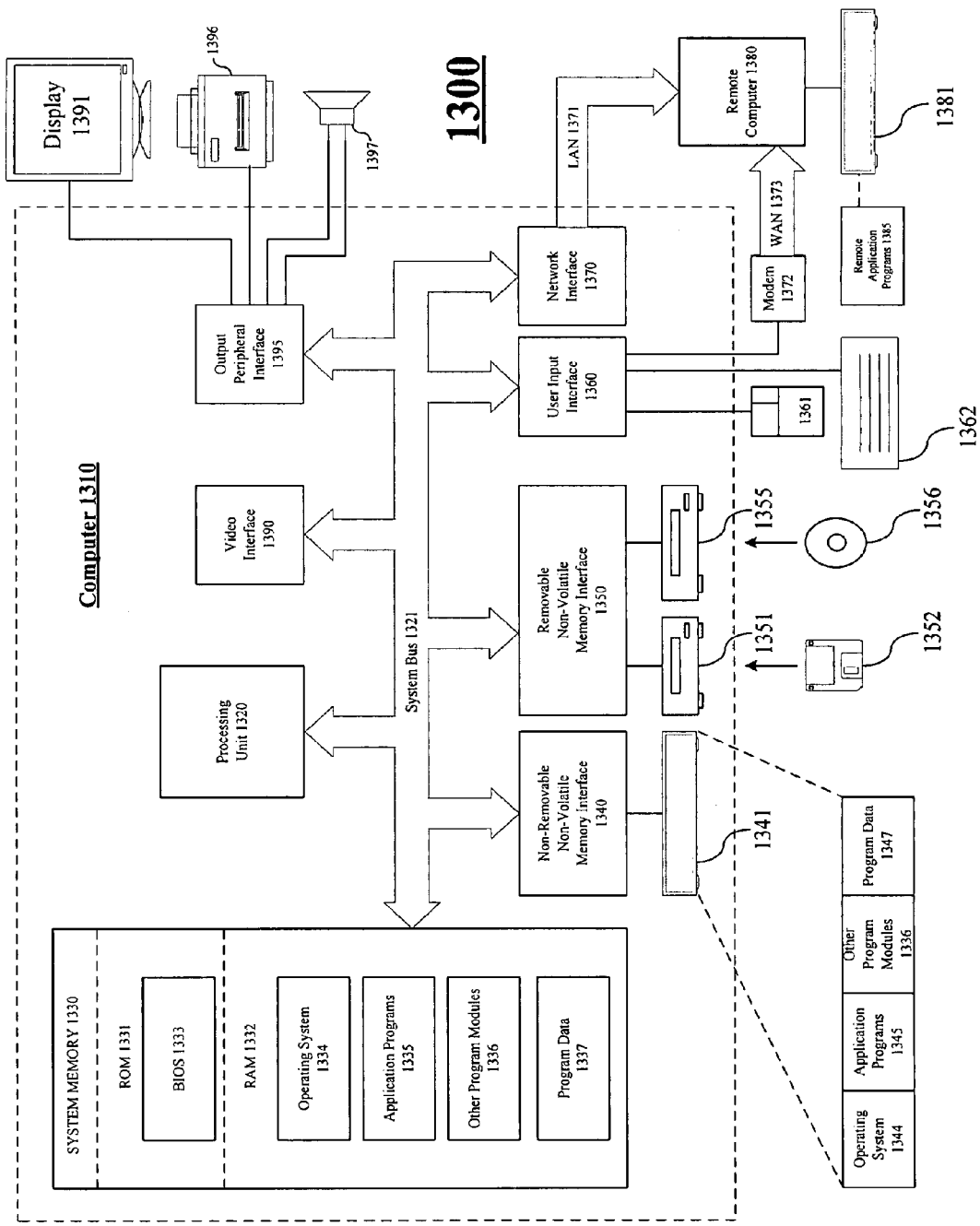
FIG. 13 illustrates one embodiment of a computing system architecture.

FIG. 13 illustrates a block diagram of a computing system architecture 1300 suitable for implementing various embodiments, including the various elements of the enterprise system 100. It may be appreciated that the computing system architecture 1300 is only one example of a suitable computing environment and is not intended to suggest any limitation as to the scope of use or functionality of the embodiments. Neither should the computing system architecture 1300 be interpreted as having any dependency or requirement relating to any one or combination of components illustrated in the exemplary computing system architecture 1300.

Various embodiments may be described in the general context of computer-executable instructions, such as program modules, being executed by a computer. Generally, program modules include any software element arranged to perform particular operations or implement particular abstract data types. Some embodiments may also be practiced in distributed computing environments where operations are performed by one or more remote processing devices that are linked through a communications network. In a distributed computing environment, program modules may be located in both local and remote computer storage media including memory storage devices.

As shown in FIG. 13, the computing system architecture 1300 includes a general purpose computing device such as a computer 1310. The computer 1310 may include various components typically found in a computer or processing system. Some illustrative components of computer 1310 may include, but are not limited to, a processing unit 1320 and a memory unit 1330.

In one embodiment, for example, the computer 1310 may include one or more processing units 1320. A processing unit 1320 may comprise any hardware element or software element arranged to process information or data. Some examples of the processing unit 1320 may include, without limitation, a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processing unit 1320 may be implemented as a general purpose processor. Alternatively, the processing unit 1320 may be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), an application specific integrated circuit (ASIC), and so forth. The embodiments are not limited in this context.

In one embodiment, for example, the computer 1310 may include one or more memory units 1330 coupled to the processing unit 1320. A memory unit 1330 may be any hardware element arranged to store information or data. Some examples of memory units may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), EEPROM, Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other medium which can be used to store the desired information and which can accessed by computer 1310. The embodiments are not limited in this context.

In one embodiment, for example, the computer 1310 may include a system bus 1321 that couples various system components including the memory unit 1330 to the processing unit 1320. A system bus 1321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and so forth. The embodiments are not limited in this context.

In various embodiments, the computer 1310 may include various types of storage media. Storage media may represent any storage media capable of storing data or information, such as volatile or non-volatile memory, removable or non-removable memory, erasable or non-erasable memory, writeable or re-writeable memory, and so forth. Storage media may include two general types, including computer readable media or communication media. Computer readable media may include storage media adapted for reading and writing to a computing system, such as the computing system architecture 1300. Examples of computer readable media for computing system architecture 1300 may include, but are not limited to, volatile and/or nonvolatile memory such as ROM 1331 and RAM 1332. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF) spectrum, infrared and other wireless media. Combinations of the any of the above should also be included within the scope of computer readable media.

In various embodiments, the memory unit 1330 includes computer storage media in the form of volatile and/or nonvolatile memory such as ROM 1331 and RAM 1332. A basic input/output system 1333 (BIOS), containing the basic routines that help to transfer information between elements within computer 1310, such as during start-up, is typically stored in ROM 1331. RAM 1332 typically contains data and/or program modules that are immediately accessible to and/or presently being operated on by processing unit 1320. By way of example, and not limitation, FIG. 13 illustrates operating system 1334, application programs 1335, other program modules 1336, and program data 1337.

The computer 1310 may also include other removable/non-removable, volatile/nonvolatile computer storage media. By way of example only, FIG. 13 illustrates a hard disk drive 1340 that reads from or writes to non-removable, nonvolatile magnetic media, a magnetic disk drive 1351 that reads from or writes to a removable, nonvolatile magnetic disk 1352, and an optical disk drive 1355 that reads from or writes to a removable, nonvolatile optical disk 1356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1341 is typically connected to the system bus 1321 through a non-removable memory interface such as interface 1340, and magnetic disk drive 1351 and optical disk drive 1355 are typically connected to the system bus 1321 by a removable memory interface, such as interface 1350.

The drives and their associated computer storage media discussed above and illustrated in FIG. 13, provide storage of computer readable instructions, data structures, program modules and other data for the computer 1310. In FIG. 13, for example, hard disk drive 1341 is illustrated as storing operating system 1344, application programs 1345, other program modules 1346, and program data 1347. Note that these components can either be the same as or different from operating system 1334, application programs 1335, other program modules 1336, and program data 1337. Operating system 1344, application programs 1345, other program modules 1346, and program data 1347 are given different numbers here to illustrate that, at a minimum, they are different copies. A user may enter commands and information into the computer 1310 through input devices such as a keyboard 1362 and pointing device 1361, commonly referred to as a mouse, trackball or touch pad. Other input devices (not shown) may include a microphone, joystick, game pad, satellite dish, scanner, or the like. These and other input devices are often connected to the processing unit 1320 through a user input interface 1360 that is coupled to the system bus, but may be connected by other interface and bus structures, such as a parallel port, game port or a universal serial bus (USB). A monitor 1391 or other type of display device is also connected to the system bus 1321 via an interface, such as a video interface 1390. In addition to the monitor 1391, computers may also include other peripheral output devices such as speakers 1397 and printer 1396, which may be connected through an output peripheral interface 1390.

The computer 1310 may operate in a networked environment using logical connections to one or more remote computers, such as a remote computer 1380. The remote computer 1380 may be a personal computer (PC), a server, a router, a network PC, a peer device or other common network node, and typically includes many or all of the elements described above relative to the computer 1310, although only a memory storage device 1381 has been illustrated in FIG. 13 for clarity. The logical connections depicted in FIG. 13 include a local area network (LAN) 1371 and a wide area network (WAN) 1373, but may also include other networks. Such networking environments are commonplace in offices, enterprise-wide computer networks, intranets and the Internet.

When used in a LAN networking environment, the computer 1310 is connected to the LAN 1371 through a network interface or adapter 1370. When used in a WAN networking environment, the computer 1310 typically includes a modem 1372 or other technique suitable for establishing communications over the WAN 1373, such as the Internet. The modem 1372, which may be internal or external, may be connected to the system bus 1321 via the user input interface 1360, or other appropriate mechanism. In a networked environment, program modules depicted relative to the computer 1310, or portions thereof, may be stored in the remote memory storage device. By way of example, and not limitation, FIG. 13 illustrates remote application programs 1385 as residing on memory device 1381. It will be appreciated that the network connections shown are exemplary and other techniques for establishing a communications link between the computers may be used. Further, the network connections may be implemented as wired or wireless connections. In the latter case, the computing system architecture 1300 may be modified with various elements suitable for wireless communications, such as one or more antennas, transmitters, receivers, transceivers, radios, amplifiers, filters, communications interfaces, and other wireless elements. A wireless communication system communicates information or data over a wireless communication medium, such as one or more portions or bands of RF spectrum, for example. The embodiments are not limited in this context.

Some or all of the enterprise system 100 and/or computing system architecture 1300 may be implemented as a part, component or sub-system of an electronic device. Examples of electronic devices may include, without limitation, a processing system, computer, server, work station, appliance, terminal, personal computer, laptop, ultra-laptop, handheld computer, minicomputer, mainframe computer, distributed computing system, multiprocessor systems, processor-based systems, consumer electronics, programmable consumer electronics, personal digital assistant, television, digital television, set top box, telephone, mobile telephone, cellular telephone, handset, wireless access point, base station, subscriber station, mobile subscriber center, radio network controller, router, hub, gateway, bridge, switch, machine, or combination thereof. The embodiments are not limited in this context.

In some cases, various embodiments may be implemented as an article of manufacture. The article of manufacture may include a storage medium arranged to store logic and/or data for performing various operations of one or more embodiments. Examples of storage media may include, without limitation, those examples as previously provided for the memory unit 1330. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. It is worthy to note that although some embodiments may describe structures, events, logic or operations using the terms "first," "second," "third," and so forth, such terms are used merely as labels, and are not intended to impose numerical requirements on their objects. Further, such terms are used to differentiate elements and not necessarily limit the structure, events, logic or operations for the elements.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
displaying a view instance of source data elements from a data source;
receiving a selection of at least one of said source data elements from said view instance, for insertion into an existing document;
receiving a selection of a business content formatter comprising at least one of a text business content formatter, a list business content formatter, an ad-hoc business content formatter, or a custom business content formatter, to format said selected source data elements;
inserting by a processor said selected source data elements into said existing document as an extensible markup language (XML) part comprising a leaf node and including an envelope, wherein said envelope describes an insertion context, said data source, a view instantiation parameter, and formatting information for said selected source data elements;
creating a word content control for a leaf node in the XML part and binding the word content control to that leaf node;
displaying a context menu when a document insertion point is within the bound word content control, the context menu providing an option to activate the view instance;
receiving a selection of the option to activate the view instance;
opening, in response to the selection, a business data task pane displaying the selected source data elements associated with the bound word content control and populated with data values from the data source; and
highlighting the selected source data elements in the business data task pane.

2. The method of claim 1, comprising:
placing the word content control on a new line in the existing document, when the text business content formatter is selected.

3. The method of claim 1, comprising:
generating a word list item at an appropriate hierarchy depth in a list in the existing document, when the list business content formatter is selected.

4. The method of claim 1, comprising:
displaying a view instance of source business data elements in the business data task pane;

receiving a selection of a business data element from the business data task pane and a drag operation of the selected business data element onto the existing document;

inserting the selected business data element into the existing document as an XML part comprising a leaf node and including an envelope, wherein said envelope describes an insertion context, said data source, a view instantiation parameter, and formatting information from an ad-hoc business content formatter for said selected source data elements; and creating a word content control for a leaf node in the XML part and binding the word content control to that leaf node.

5. An article comprising physical memory containing instructions that when executed enable a system to:

display a view instance of source data elements from a data source;

receive a selection of at least one of said source data elements from said view instance, for insertion into an existing document;

select a business content formatter comprising at least one of a text business content formatter, a list business content formatter, an ad-hoc business content formatter, or a custom business content formatter, to format said selected source data elements;

insert by a processor said selected source data elements into said existing document as an extensible markup language (XML) part comprising a leaf node and including an envelope, wherein said envelope describes an insertion context, said data source, a view instantiation parameter, and formatting information for said selected source data elements;

create a word content control for a leaf node in the XML part and binding the word content control to that leaf node;

display a context menu when a document insertion point is within the bound word content control, the context menu providing an option to activate the view instance;

receive a selection of the option to activate the view instance;

open, in response to the selection, a business data task pane displaying the selected source data elements associated with the bound word content control and populated with data values from the data source; and highlight the selected source data elements in the business data task pane.

6. The article of claim 5, comprising instructions that when executed enable the system to:

place the word content control on a new line in the existing document, when the text business content formatter is selected.

7. The article of claim 5, comprising instructions that when executed enable the system to:

generate a word list item at an appropriate hierarchy depth in a list in the existing document, when the list business content formatter is selected.

8. The article of claim 5, comprising instructions that when executed enable the system to:

display a view instance of source business data elements in the business data task pane;

receive a selection of a business data element from the business data task pane and a drag operation of the selected business data element onto the existing document;

insert the selected business data element into the existing document as an XML part comprising a leaf node and including an envelope, wherein said envelope describes an insertion context, said data source, a view instantiation parameter, and formatting information from an ad-hoc business content formatter for said selected source data elements; and create a word content control for a leaf node in the XML part and binding the word content control to that leaf node.

9. An apparatus comprising:

a client device having a processor and memory, said memory to store an application program, an insertion component and an update component, said processor to:

execute said insertion component to insert source data elements from a data source into an existing document for said application program as an extensible markup language (XML) part including an envelope, wherein said envelope describes an insertion context, said data source, a view instantiation parameter, and formatting information for said inserted data elements, execute a display component to display a view instance of said source data elements;

execute a selection component to select said source data elements from said view instance, for insertion into said existing document;

execute a format component to receive a selection of a business content formatter comprising at least one of a text business content formatter, a list business content formatter, an ad-hoc business content formatter, or a custom business content formatter, to format said inserted source data elements, the business content formatter to create a word content control for a leaf node in the XML part and bind the word content control to that leaf node;

the display component further to:

display a context menu when a document insertion point is within the bound word content control, the context menu providing an option to activate the view instance;

receive a selection of the option to activate the view instance;

open, in response to the selection, a business data task pane displaying the selected source data elements associated with the bound word content control and populated with data values from the data source; and highlight the selected source data elements in the business data task pane.

10. The apparatus of claim 9, the business content formatter to: place the word content control on a new line in the existing document, when the text business content formatter is selected.

11. The apparatus of claim 9, the business content formatter to: generate a word list item at an appropriate hierarchy depth in a list in the existing document, when the list business content formatter is selected.

12. The apparatus of claim 9, wherein:

the display component to display a view instance of source business data elements in the business data task pane;

the format component to receive a selection of a business data element from the business data task pane and a drag operation of the selected business data element onto the existing document;

the insertion component to insert the selected business data element into the existing document as an XML part comprising a leaf node and including an envelope, wherein said envelope describes an insertion context, said data source, a view instantiation parameter, and formatting information from an ad-hoc business content formatter for said selected source data elements; and the business content formatter to create a word content control for a leaf node in the XML part and bind the word content control to that leaf node.

\* \* \* \* \*